United States Patent
Seffernick et al.

[11] Patent Number: 6,040,823
[45] Date of Patent: Mar. 21, 2000

[54] COMPUTER KEYBOARD HAVING TOP MOLDED HOUSING WITH RIGID POINTING STICK INTEGRAL AND NORMAL TO FRONT SURFACE OF HOUSING AS ONE UNIT PART TO BE USED WITH STRAIN SENSORS IN NAVIGATIONAL CONTROL

[75] Inventors: Lewis L. Seffernick, Adams; David L. Poole, Portland, both of Ind.

[73] Assignee: CTS, Elkhatt, Ind.

[21] Appl. No.: 08/982,619

[22] Filed: Dec. 2, 1997

[51] Int. Cl.[7] .............................. G09G 5/00; G09G 5/08; H03K 17/94
[52] U.S. Cl. .............................. 345/168; 345/161; 341/34
[58] Field of Search ..................................... 345/156, 157, 345/158, 160, 161, 164, 168, 178; 341/34

[56] References Cited

U.S. PATENT DOCUMENTS

| | | | |
|---|---|---|---|
| 5,473,347 | 12/1995 | Collas et al. | 345/169 |
| 5,489,900 | 2/1996 | Cali et al. | 341/34 |
| 5,499,041 | 3/1996 | Brandenburg et al. | 345/171 |
| 5,515,040 | 5/1996 | Lee et al. | 340/870.04 |
| 5,579,033 | 11/1996 | Rutledge et al. | 345/161 |
| 5,594,618 | 1/1997 | Sellers . | |
| 5,640,178 | 6/1997 | Endo et al. . | |
| 5,659,334 | 8/1997 | Yaniger et al. . | |
| 5,701,142 | 12/1997 | Brown et al. | 345/168 |
| 5,748,180 | 5/1998 | Inukai | 345/161 |
| 5,754,167 | 5/1998 | Narusawa et al. | 345/168 |
| 5,889,507 | 3/1999 | Engle et al. | 345/168 |
| 5,894,301 | 4/1999 | Seffernick | 345/160 |

*Primary Examiner*—Jeffery Brier
*Assistant Examiner*—Paul A. Bell
*Attorney, Agent, or Firm*—Mark P. Bourgeois; Albert W. Watkins

[57] ABSTRACT

A computer keyboard has a pointing stick integrally molded into and projecting from a surface of a plastic housing. Keyboard keys extend through holes in the same plastic housing. Strain-sensitive resistors are formed in a small location onto a circuit substrate. The same circuit substrate that carries the strain-sensitive resistors also carries conductive pads for the key switches. The strain-sensitive resistor location is bonded to the housing adjacent the pointing stick, but on an opposite surface of the housing from the pointing stick protrusion.

15 Claims, 2 Drawing Sheets

COMPUTER KEYBOARD HAVING TOP MOLDED HOUSING WITH RIGID POINTING STICK INTEGRAL AND NORMAL TO FRONT SURFACE OF HOUSING AS ONE UNIT PART TO BE USED WITH STRAIN SENSORS IN NAVIGATIONAL CONTROL

BACKGROUND OF THE INVENTION

1. Field of the Invention

This invention pertains generally to selective visual display systems, and particularly to display peripheral input devices of the joystick or pointing stick type. These devices find primary application with computer operators to control the position of a pointer or cursor on a computer display, though other applications combining keys and navigational control are well known and contemplated by the present inventors. For the purposes of this disclosure, a key will be defined herein as "a button or lever that is pressed with the finger to operate a machine." The machine may be selected from many types of devices, including remote controls for televisions, sound systems and other similar devices, computers and computer displays, appliances, airplanes (both radio controlled and otherwise), large and small machinery, land vehicles, and many other diverse devices too numerous to mention.

2. Description of the Related Art

Computing and calculating tools have existed in various form for thousands of years, dating back to devices such as the abacus. These tools simplified basic tasks, thereby saving time and allowing humans to direct their efforts to other important activities.

With the advent of electronic circuits and systems came the development of general purpose computers, which could be used for more than one function. Through special programming, computers could be used to emulate or model other devices and systems, allowing the computer to be applied to diverse and complicated tasks. Many early general purpose computers depended upon punched cards or paper tapes for input of instructions, and, after performing necessary computation, printed output onto paper. This is referred to as batch processing. As might be expected, the instruction set would often be inadequate, and so an operator would be required to replace or add necessary instructions by replacing the punched cards. Needless to say, the computers were not well suited for performing instructions and operations in real time. Furthermore, the computers required large space and enormous electric power, frequently requiring entire rooms and special air-conditioning systems.

As microelectronics progressed, general purpose computers continued to become capable of more and more diverse tasks. Typewriter-style keyboards and other input devices replaced punched cards, and television-style video displays and electronic output complimented paper print-outs. Numerous further developments eventually led to the current interactive video display. Pictorial symbols, commonly known as icons and buttons, provide visual as well as textual identification of functions available to the computer user. Through a navigational control, the user may simply move about the display and select from the icons and buttons. With improved user interface and enhanced capability, computers are now widely used. These computers, more powerful than the greatest super computers of only a few decades ago, are commonly referred to as personal computers or PC's. The enormous computational capability has led to applications for personal computers extending to areas well beyond the initial accounting and typewriter functions, and new applications are continuously being developed.

With the new applications and interactive video display has come a desire for better ways to provide input to the computer. While the keyboard continues to dominate as the best method for textual input, navigational functions including cursor position control are now primarily being performed with input devices such as a mouse, trackball, touch pad, joystick or pointing stick. These devices indicate the user's desire for cursor movement more naturally to the computer than a keyboard can. For example, the movement of a trackball or mouse in one direction, which may be at any angle on a planar surface from zero through 360 degrees, can be precisely translated to the computer. Furthermore, the amount of movement desired is also readily communicated by the relative rate of movement of the mouse or trackball. These desires are communicated from a relatively small device, most frequently smaller than a human hand.

Unfortunately, with a mouse, joystick or many trackballs the user must first remove one hand from the keyboard. Since, as aforementioned, the keyboard is still the primary source for textual input, the removal of one hand therefrom is most undesirable. Rapid placement of the hand upon a keyboard is nearly impossible, and nearly all computer users have experienced the frustration of incorrectly placing one or both hands on the keyboard and mistakenly typing incorrect keys. Furthermore, the mouse in particular requires a relatively large flat surface upon which to travel, which is often unavailable on crowded desktops or when the PC is a portable, notebook type computer.

In recognition of these and other drawbacks of the prior art, a number of devices have been modified or designed. Trackballs have been designed with much smaller dimension, as have touch pads. Unfortunately, neither of these devices is small enough to fit within the existing, already crowded typewriter style keyboard. When a mouse is unsuitable, the pointing stick is presently the most widely accepted device for navigational control. The pointing stick is a small stick which protrudes vertically out from a keyboard, frequently between keys. The pointing stick incorporates several small sensors, frequently of the strain-gauge type, which sense applied force and direction with very little or no actual movement of the stick. Because the pointing stick is force-sensitive, rather than sensitive to actual movement, very little space is required. As already noted, that means that the too pointing stick may be included within a keyboard. Furthermore, the pointing stick may be designed to be sensitive to force along all three spatial axes, rather than the two axes available to a mouse or trackball.

Placement of the pointing stick is frequently in the lower central region of a keyboard. This placement is arrived at out of convenience, allowing a user to control the pointing stick with either the left or right pointer finger. Presently, these pointing sticks are manufactured separately from the balance of the keyboard, and placed within the keyboard during keyboard assembly. Illustrative of this type of assembly are U.S. Pat. No. 5,594,618 to Sellers, U.S. Pat. No. 5,640,178 to Endo et al and U.S. Pat. No. 5,659,334 to Yaniger et al, each incorporated herein by reference for their respective teachings of pointing device assembly and operation, and all references that each incorporated or included therein. The Sellers reference further provides a side view of a typical notebook computer keyboard assembly. However, none of these prior art references provide for a fully integral pointing device. The need for separate assembly and mounting of the pointing device not only adds to the cost of the finished computer, but complicates assembly therein. Particularly with force-sensitive pointing sticks, the pointing stick must somehow be securely anchored to prevent motion at the base thereof. As can be seen in each of the references, this requires the addition of some type of fastener.

SUMMARY OF THE INVENTION

In a first manifestation, the invention is a computer keyboard having a plastic molded housing. The housing has a first major surface through which keys pass to a wiring layer to control electrical connection. The keyboard further has a backing plate for structural support and protection. The keyboard has in further combination a rigid projection extending normal to the first major surface, between keys, and a strain sensor adhered to the molded housing adjacent the rigid projection.

In a second manifestation, the invention is a display peripheral input device suitable for use in a selective visual display system comprising a keyboard having keys controlled by tactile force and a pointing stick, the pointing stick extending from and normal to a major surface of a generally planar key support structure and transmitting tactile force applied thereto to the planar key support structure, and a strain sensor operatively attached to the planar key support structure to sense transmitted tactile force, wherein a user may apply tactile force to the pointing stick to control a selective visual display system.

In a third manifestation, the invention is a combined keyboard and navigational control comprising a rigid, generally planar key support having formed thereon a small protrusion; a flexible, compliant film adhesively bonded to the key support adjacent the small protrusion; a strain sensor supported upon the flexible compliant film; and electrical traces connecting the flexible compliant film to an electrical connector and therethrough to an electrical device.

OBJECTS OF THE INVENTION

A first object of the present invention is to provide a pointing device having few piece parts which is relatively easy to assemble. Another object of the present invention is to provide a robust pointing stick which will withstand relatively high overload forces applied thereto without destruction or failure. A further object of the invention is to provide a reliable pointing device which does not require significant calibration or compensation, and which provides appropriate sensitivity. These and other objects of the invention are accomplished in the exemplary preferred embodiment, which will be best understood in association with the appended drawings.

DESCRIPTION OF THE PREFERRED EMBODIMENT

Figure 1:
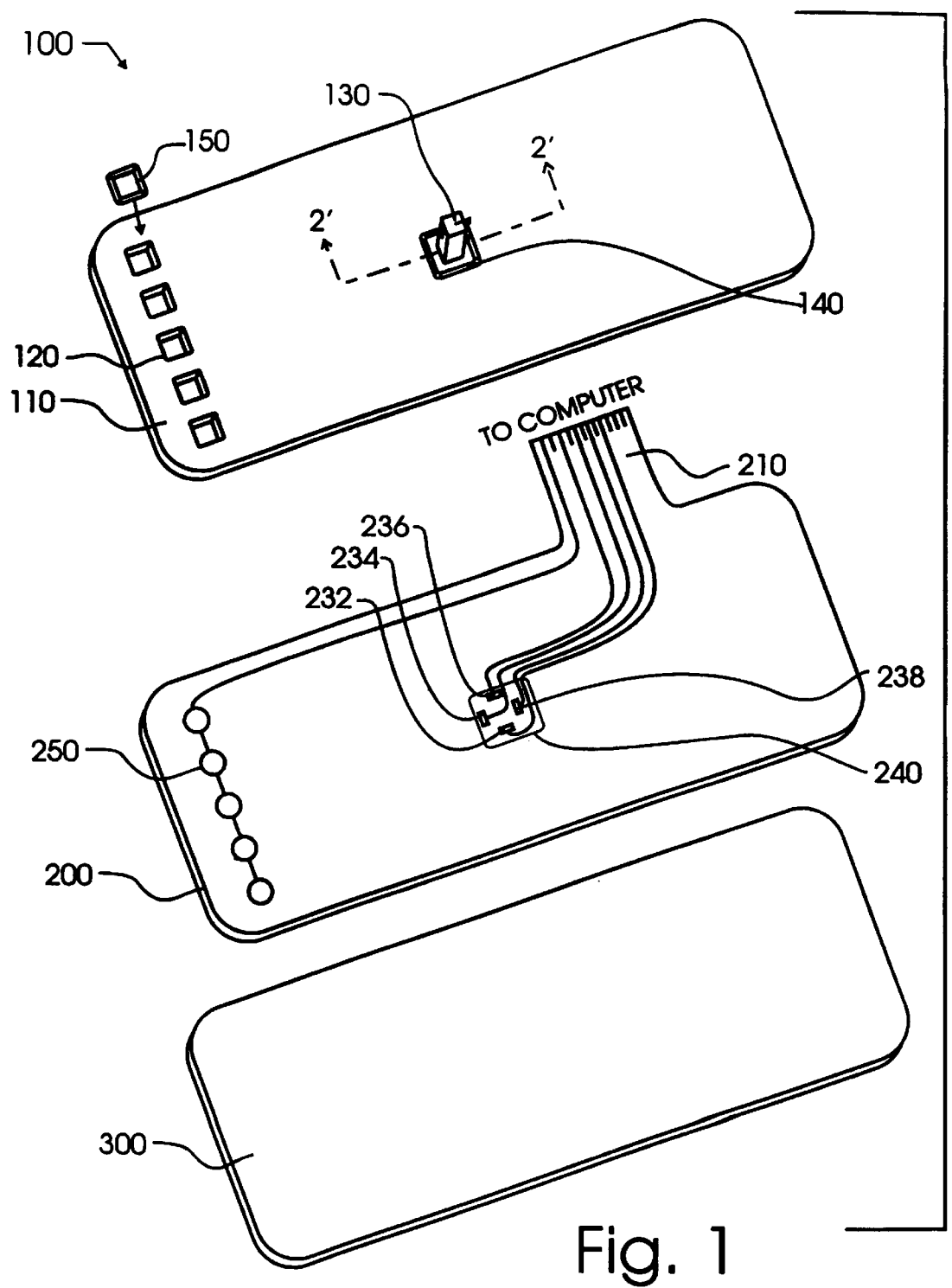
FIG. 1 illustrates the preferred embodiment by exploded, projected assembly view.

FIG. 1 illustrates plastic molded housing 110, keyboard keys 150, plastic film 200, and backing plate 300, which are ultimately assembled to form a keyboard assembly 100. Through housing 110 there are a number of cut-out holes 120, through which keys 150 will pass after assembly. It is important to note here that many features common to keyboards and well known in the art have been omitted from the figures to help emphasize components important to the preferred embodiment of the present invention, but they will be understood to be included as required and understood by one of ordinary skill. For example, only one key 150 is illustrated, even though modern keyboards typically have one hundred or more keys. Furthermore, only five cut-out holes 120 are illustrated in FIG. 1, while most typical keyboards have similar cut-out holes for each of the hundred keys. None of the electronic circuitry has been illustrated, and so forth. These omitted features are well known and common to computer keyboards and other combined keyboards and navigational controls of the prior art and will be understood to be included herein, even though not expressly illustrated.

Plastic molded housing 110, which is otherwise generally planar in configuration, includes plastic post 130 which protrudes in a direction normal to the major surface of housing 110. Post 130 serves as a pointing stick in assembled keyboard 100, and so may have special features molded therein which will improve tactile contact or assist with placement and retention of caps and other similar covers. Near the base of post 130, and forming a recess around, is force concentrator 140. Force concentrator 140 will typically be formed during the molding operation as a small recess in housing 110 which thins housing 110 to help concentrate forces transmitted through pin 130 to a region adjacent concentrator 140. Because strength, durability and weight are common considerations in computer keyboards, the material selected for housing 110 will most preferably be relatively lightweight and robust. Materials suited for this type of keyboard are usually selected from among polyamides, polyimides and copolymers such as acrylic-butadiene-styrene (ABS) plastics, but the material choice is not so limited. Care must, however, be taken to ensure that the material chosen is not unduly brittle or soft, since tactile forces will need to be transmitted from post 130 through concentrators 140 without destruction thereof when an overload force is applied. Such an overload is known to occur when keyboard 100 is accidentally dropped, or when a relatively heavy object such as a stapler or cup is dropped thereon. Housing 110 having cut-outs 120 and post 130 is most preferably formed in a single plastic molding operation, thereby maintaining comparable cost to an entirely planar housing of the prior art.

Immediately adjacent to housing 110 is a plastic film 200 which serves as a printed wiring board with circuit routings patterned thereon. Film 200 may be a single layer film as shown in FIG. 1, or may be a multi-layer film as illustrated by cross-section in FIG. 2 with multiple layers 202, 204, 206 and 208. Most preferably, however, film 200 will be relatively flexible and pliant, for reasons to be detailed below. On a major surface of film 200 there is provided a usual grid of conductive pads 250 that are ultimately electrically connected to end connector 210.

In the region of film 200 which will ultimately be adjacent to post 130 and force concentrator 140, identified in FIG. 1 by the region bounded by line 240, there are four strain sensitive resistors 232–238. These may be manufactured from a variety of techniques, the most simple being the painting or screening of carbon or metal-filled polymer-binder resistive paints. There are a host of known alternatives which could be made to be suitable, such as thin film or metal foil elements and any of the others of the multitude of known strain sensitive materials. However, for the purposes of the preferred embodiment, polymer type paints are most preferred. Four elements are also preferable, though other numbers of elements are known in the art and would also be suitable. Each of the strain sensitive resistors 232–238 are preferably electrically connected to end connector 210, through which measures of strain may be taken.

During assembly, region 240 is adhesively bonded to housing 110 so as to locate resistors 232–238 adjacent to force concentrator 140. By making film 200 pliant, and then adhering region 240, resistors 232–238 will accurately measure forces applied in each of the three orthogonal spatial axes(X, Y, and Z). If film 200 is too rigid, the forces will be distributed throughout rather than being concentrated adjacent force concentrator 140. Additionally, if film 200 is rigid there arises the potential for differential thermal expansion and contraction between film 200 and housing 110, which might result in distorted readings from resistors 232–238. Therefore, most preferably, film 200 is relatively flexible and compliant.

Additional structural support is provided through backing plate 300, which will typically be mechanically attached to housing 110. The material selected for backing plate 300 is not important, so long as the plate serves to provide the structural characteristics desired.

Figure 2:
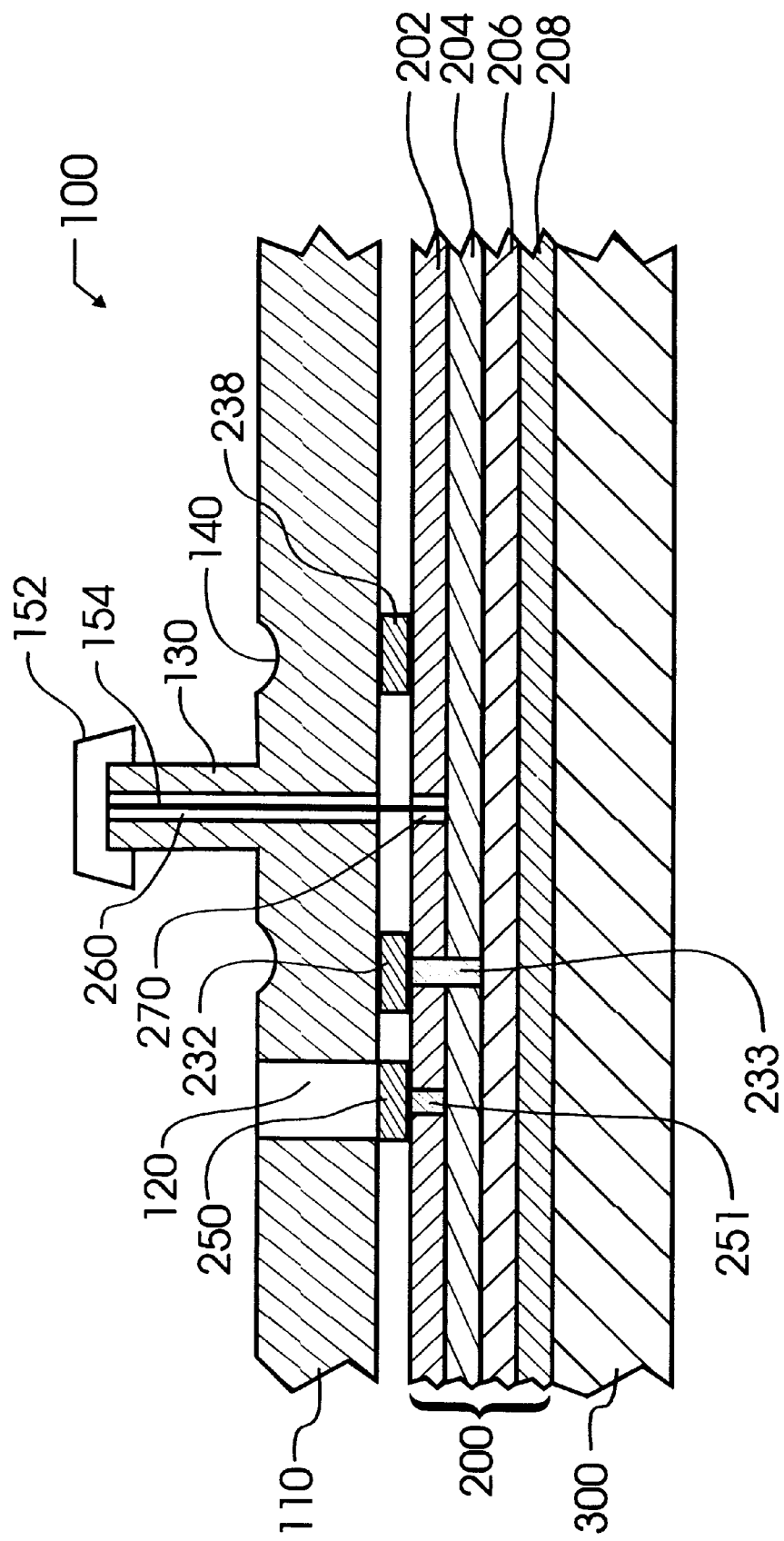
FIG. 2 illustrates the preferred embodiment from a partial cross-section view taken along line 2' of FIG. 1, and additionally includes several alternative component configurations.

FIG. 2 illustrates a partial cross-section view taken along line 2' in FIG. 1. Therein the geometry of concentrator 140 is more visible. While a curve or trough shape is shown, one of ordinary skill will recognize that there are many known concentrator geometries and that many of the geometries will be suited for this application. The elevation of resistors 232 and 238, as well as the elevation of conductive pad 250, is visible in FIG. 2. While not visible, the adhesive used to bond region 240 to housing 110 may in some instances fill in between each of the resistors 232–238. In some applications it may be desirable to fill and level between each of the components 250 and 232–238, and such would not be beyond the scope of the invention. However, in most applications not requiring hermeticity or water exposure, the presence of gaps is inconsequential.

FIG. 2 also illustrates a passageway 260 through post 130 in a direction co-axial with post 130. This optional passageway 260, not illustrated in FIG. 1, may be used to provide a bore into which a Z-axis switch may be placed. For example, using the multiple layers 202, and 204 of film 200, an electrical contactor 154 may be inserted into bore 260 to make electrical contact through layer 202 to layer 204 or upon the surface of layer 204 through via hole 270. Contactor 154 will typically be actuated by motion of pointer key 152 in the vertical, or z-axis, direction. As will be apparent to those of ordinary skill, bore 260 may serve a variety of diverse purposes beyond a switch, which application is not restricted by the present preferred embodiment or invention.

Once keyboard assembly 100 is complete, assembly 100 may be integrated into a keyboard housing and interconnected through further electrical connectors to a computer as is known in the art. An operator would then apply pressure in any direction, and the same would be sensed through resistors 232–238. The combination of forces along any of the three orthogonal axes may then be computed, or other action taken, as programmed at the computer. For instance, a computer pointer could be moved in accord with the direction and magnitude of applied force. The various keys may also be pressed and sensed through end connector 210. In the alternative embodiment of film 200 illustrated in FIG. 2 having layers 202–208, small vias may also be provided to carry signals from various surface components down into film 200 to one of several additional wiring layers located between layers 202–208. For example, via 251 is electrically conductive and will conduct between conductive pad 250 and wiring between layers 202 and 204. Via 233 electrically connects from resistor 232 to wiring between layers 204 and 206. The wiring commonly found on multilayer substrates is well-known in the substrate art and will therefore not be discussed in detail herein.

The particular combination of features provides a pointing device having few piece parts which is relatively easy to assemble The molded housing 110 requires an only slightly reconfigured mold, and film 200 requires an additional screening process and adhering step. Otherwise, the manufacturing remains the same as might be typical of a standard keyboard without any pointer. As long as the materials are properly chosen as outlined hereinabove, the preferred embodiment will be very robust, capable of withstanding very substantial overload forces.

While the foregoing details what is felt to be the preferred embodiment of the invention, no material limitations to the scope of the claimed invention are intended. Further, features and design alternatives that would be obvious to one of ordinary skill in the art are considered to be incorporated herein. For example, while only three layers are illustrated in the preferred embodiment, including housing 110, film 200 and backing plate 300, additional layers which only serve a partial function are certainly contemplated, such as an additional film between film 200 and housing 110 serving exclusively to carry strain gauge resistors 232–238 and having holes therethrough, or even having contacts on a back surface thereof. As aforementioned, applications other than computer keyboards may preferably include only one or a few keys, and may have different relative proportions or dimensions from a computer keyboard. The present invention is contemplated for applications including, but not limited to computer keyboards. These types of alterations and variations for different use, which are well known in the keyboard, switch and navigational control arts, are considered incorporated herein. The scope of the invention is set forth and particularly described in the claims hereinbelow.

We claim:

1. A computer keyboard having a plastic molded housing having a first major surface through which keys pass to a wiring layer to control electrical connection and further having a backing plate for structural support and protection, wherein the improvement comprises in further combination a rigid projection extending normal to said first major surface between said keys;

a strain sensor adhered to said molded housing adjacent said rigid projection; and a force concentrator formed within said plastic molded housing adjacent said rigid projection;

wherein said rigid projection, force concentrator and housing are all formed during a single molding process as an integral unit.

2. The keyboard of claim 1, wherein said strain sensor is formed upon said wiring layer prior to adhesion with said housing.

3. The keyboard of claim 2, wherein said strain sensor comprises conductive-particle filled polymer paint.

4. A display peripheral input device suitable for use in a selective visual display system, comprising:

a) a keyboard, having:

a1) keys controlled by tactile force;

a2) a generally planar key support structure with a major surface; and a3) a strain sensor operatively attached to said planar key support structure to generate electrical signals in response to receiving applied forces; and b) a pointing stick, formed monolithically with said generally planar key support structure and extending from and normal to the major surface, for first receiving and then transmitting an applied tactile force to said planar key support to further transmit said applied tactile force to said strain sensor for generating electrical signals to control said selective visual display system.

5. The display peripheral input device of claim 4, further comprising an electrical wiring substrate supporting electrical traces between electrical switches actuated by said keys and further supporting said strain sensor.

6. The display peripheral input device of claim 5, wherein said strain sensor comprises two discrete strain gauge resistors arranged orthogonally to said pointing stick.

7. A combined keyboard and navigational control, comprising:
   a) a rigid, generally planar key support having formed thereon a small protrusion;
   b) a flexible, compliant film bonded to said key support adjacent said small protrusion;
   c) a strain sensor supported upon said flexible compliant film adjacent said small protrusion; and
   d) electrical traces connecting said flexible compliant film to an electrical connector and therethrough to an electrical device.

8. The combined keyboard and navigational control of claim 7, further comprising a plurality of holes through said key support.

9. The combined keyboard and navigational control of claim 8, further comprising a plurality of keys passing through said plurality of holes.

10. The combined keyboard and navigational control of claim 9, further comprising a plurality of switches activated by said plurality of keys.

11. The combined keyboard and navigational control of claimed 10, further comprising additional electrical traces connecting said switches to said electrical connector and therethrough to said electrical device.

12. The combined keyboard and navigational control of claim 8, further comprising two force concentrators arranged orthogonally to each other and adjacent to said small protrusion.

13. The combined keyboard and navigational control of claim 12, wherein said strain sensor further comprises two discrete strain-sensing components arranged orthogonally to each other and in cooperative arrangement with said force concentrators to measure a force amplified by said force concentrators.

14. The combined keyboard and navigational control of claim 13, wherein said force concentrators comprise small indentations in said rigid support adjacent said small protrusion.

15. A pointing device integral to a keyboard, comprising:
   a) a monolithic key support structure through which keys pass from a first key side to a second wiring side and further having a pointing stick forming a part of said monolith;
   b) a bore extending within said pointing stick from a first longitudinal end to a second longitudinal end opposite said first longitudinal end and communicating from said first key side to said second wiring side.

* * * * *